United States Patent [19]

Inoue

[11] Patent Number: 4,671,402
[45] Date of Patent: Jun. 9, 1987

[54] FREE FLOW CONVEYOR

[75] Inventor: Toshiaki Inoue, Tokyo, Japan

[73] Assignee: Sanshin Shokai Co., Ltd., Tokyo, Japan

[21] Appl. No.: 715,451

[22] Filed: Mar. 25, 1985

[51] Int. Cl.[4] .............................................. B65G 37/00
[52] U.S. Cl. .................................................. 198/465.3
[58] Field of Search .................. 198/465.1, 465.3, 414, 198/457, 463.2, 463.3, 465.4, 798–802, 803.01, 803.2; 187/20, 24; 414/268, 272, 273, 274, 275, 276, 277, 278, 279, 280, 281, 282, 283, 284, 285, 286

[56] References Cited

U.S. PATENT DOCUMENTS

| | | | |
|---|---|---|---|
| 2,856,081 | 10/1958 | Zaha | 198/798 X |
| 3,403,794 | 10/1968 | Lopez | 198/799 X |
| 3,815,723 | 6/1974 | Wright et al. | 198/798 X |
| 3,887,089 | 6/1975 | Francis | 198/798 X |
| 4,088,220 | 5/1978 | Jacksch et al. | 198/465.3 X |
| 4,461,216 | 7/1984 | Carney | 198/465.1 X |
| 4,468,165 | 8/1984 | Kawasaki | 198/465.1 X |

Primary Examiner—Robert J. Spar
Assistant Examiner—Lyle Kimms
Attorney, Agent, or Firm—Schwartz & Weinrieb

[57] ABSTRACT

A free flow conveyor which conveys in order a plurality of pallets freely loaded on roller chains in a required direction comprises a conveying feed path for the pallets to be defined at a first horizontal elevational level, another conveying return path for the pallets to be defined therebelow, and roller chains, to be mounted on both sides of the conveying paths, being endlessly wound in common with both feed and return paths so that the roller chains can be commonly driven. This invention will therefore provide a simple mechanism and a reduction in operating costs so as to eliminate the disadvantages of a free flow conveyor to which the prior art pertains.

20 Claims, 3 Drawing Figures

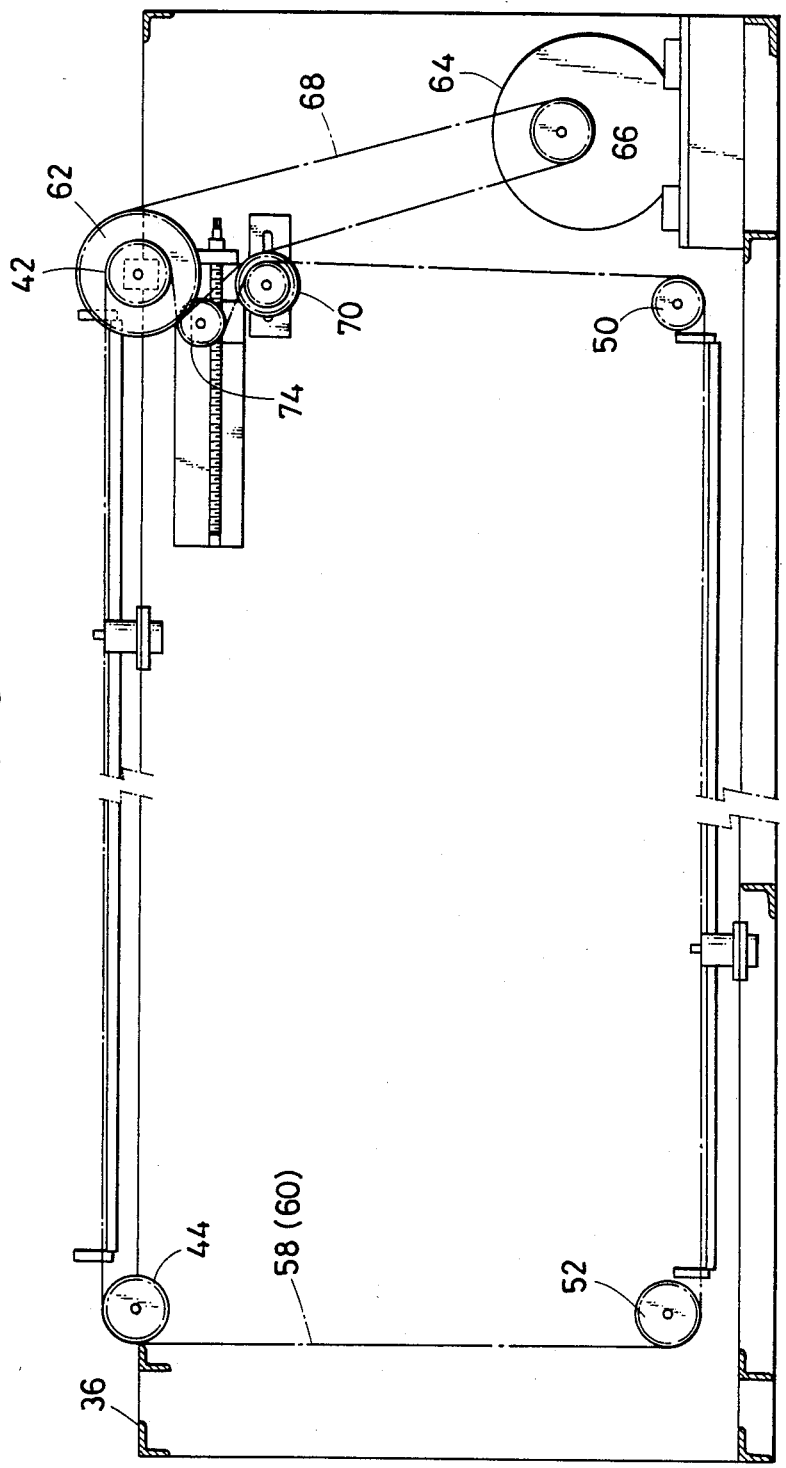

FREE FLOW CONVEYOR

BACKGROUND OF THE INVENTION OF THE INVENTION

1. Field of the Invention

This invention relates to improvements in free flow conveyors, and more specifically to a free flow conveyor in which roller chains are incorporated to define an upper coveying path in common with another one therebelow so as to simplify the system thereof and to reduce the driving energy required.

2. Description of the Pior Art

In order to convey pallets freely loaded on a pair of roller chains which respectively travel freely on both sides of the conveying path, a free flow conveyor typical of the prior art has been favorably employed in a production line for electrical components. In such a free flow conveyor typical of the prior art, the conventionally basic mechanism, as shown in FIG. 1, comprises an upper conveying feed path 10 for the pallets, a conveying return path 12 for the pallets therebelow, sprocket members 14a, 16a, 14b, and 16b mounted within each conveying path with endless roller chain members 18, 20 respectively wound thereon, and separately equipped motor members 22, 24 for independently driving the roller chain members 18, 20. Referring to FIG. 1 in particular, shown therein and designated by reference numeral 26 are the pallets which are freely loaded on the roller chain members 18, 20, and designated by the numerals 28, 30, respectively, are elevator members for transferring the pallets at both terminal ends of the conveying feed path 10 and the conveying return path 12. The elevator members 28, 30 have their own endless roller chain members 32, 34, respectively, for supporting the pallets. For example, initially, after the endless roller chain 32 of elevator mechanism 28 has received the pallets which have been conveyed on the conveying feed path 10, the elevator 28 is lowered to the level of the conveying return path 12, and secondly, the roller chain 32 is fed in the counterclockwise direction so as to transfer the pallets 26 to the conveying return path 12. The pallets 26 conveyed onto the conveying return path 12 are then transferred to the other endless roller chain 34 of elevator mechanism 30, after which the elevator 30 is elevated up to the level of the conveying feed path 10, and subsequently, the pallets are transferred to the conveying feed path 10 by clockwise movement of the endless roller chains 34.

Such being the foregoing case with the conventional free flow conveyor, however, the mechanism of moving the endless roller chains independently for each conveying path, and of providing separately equipped driving motors may lead to considerable disadvantages which include not only the need for an intricate mechanism and an increasing number of component members, but large operating costs due to the large amount of driving energy required.

OBJECTS OF THE INVENTION

Accordingly, one of the objects of the present invention is to the above disadvantages associated with the previously known mechanism used in free flow conveyors.

Another object is to provide a simple mechanism and a reduction in operating costs.

SUMMARY OF THE INVENTION

In accordance with a more specific aspect of the present invention and in order to attain the above objects, the free flow conveyor which conveys, in order, a plurality of pallets freely loaded on roller chains to a required destination characteristically comprises a conveying feed path for the pallets installed at a first horizontal elevation, a conveying return path for the pallets disposed therebelow, and roller chains mounted on both sides of the conveying paths so as to be endlessly wound on both conveying paths installed respectively thereabove and therebelow so that the roller chains can be commonly driven by connecting each roller chain with a common driving source.

BRIEF DESCRIPTION OF THE DRAWINGS

These and other objects and advantages of the free flow conveyor of the present invention will become more apparent from the following description of the preferred embodiments with reference to the accompanying drawings, wherein:

FIG. 3 is a side view of the free flow conveyor illustrated FIG. 2.

DETAILED DESCRIPTION OF THE INVENTION

Figure 2:
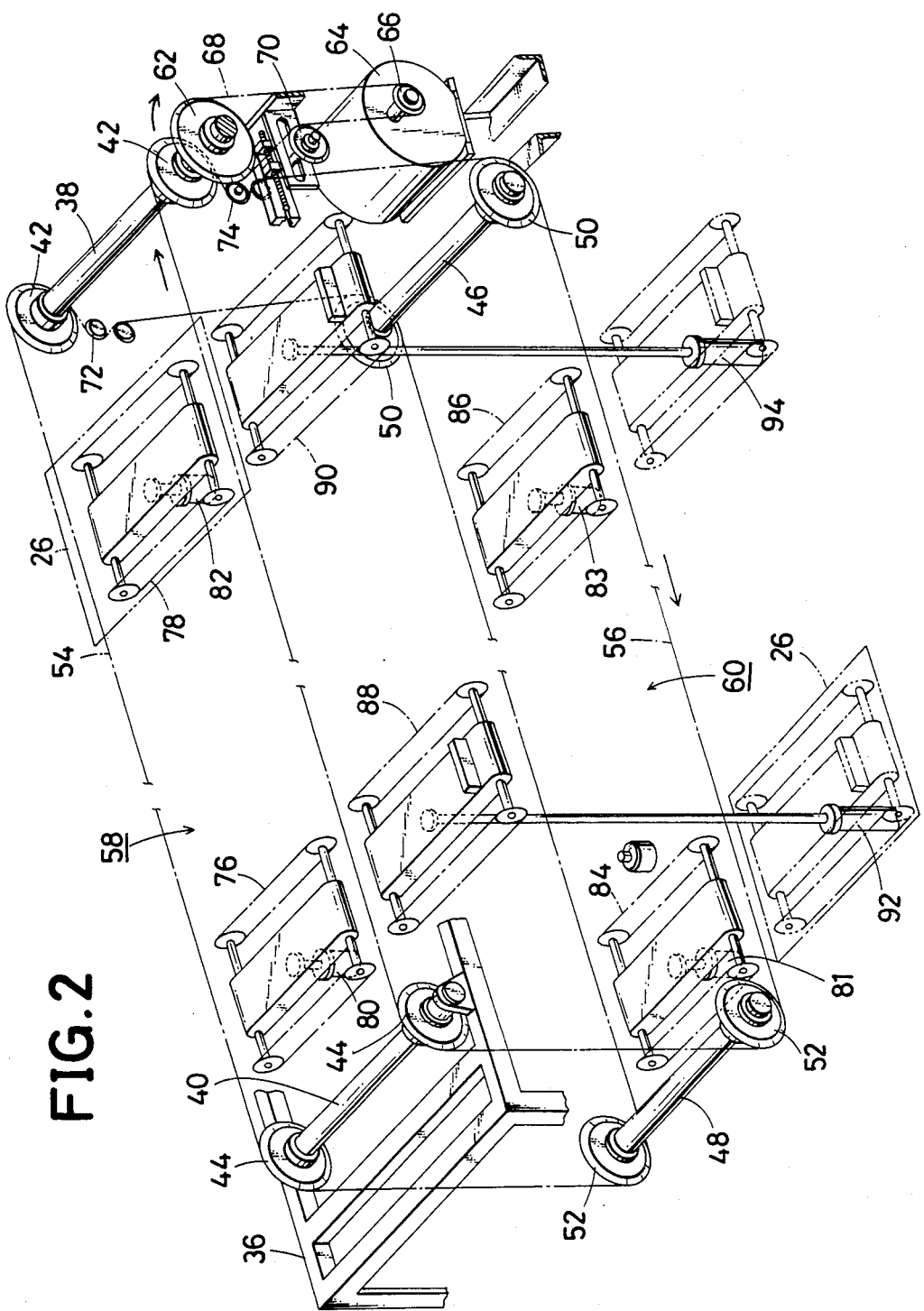
FIG. 2 is a schematic view in perspective of the free flow conveyor of the present invention.

Referring first to FIG. 2, a driving shaft 38 and a driven shaft 40 are rotatably supported so as to leave a required spacing above a conveyor frame designated by the reference numeral 36 and sprocket members 42, 44, as illustrated in the drawing, are securely mounted on both ends thereof. Driven shaft members 46, 48 are rotatably supported in positions corresponding to the above driving and driven members 38 and 40, respectively, and other sprocket members 50, 52 are securely mounted on both ends thereof. The sprocket group 42, 50, 52, 44 located on one side of the driving shaft 38 and each driven shaft member 40, 46, 48 have wound thereon in common an endless roller chain 54, and the sprocket members group 42, 50, 52, 44 located on the other side have wound thereon in common another endless roller chain 56 from which an independent free flow conveyor is formed. In both conveying paths consisting of the roller chains 54, 56, a conveyor line located at the upper level will be employed as a conveying feed path 58 for the pallets, and another conveyor line located therebelow will be employed as a conveying return path 60 for the pallets.

A sprocket 62 is secured on one end of the driving shaft 38, and an endless chain 68 is wound between a sprocket 66 secured to an output shaft of a motor 64 to be used for a common driving source for the two conveying paths and sprocket 62, whereby the power of the motor 64 is transmitted. As shown in FIGURE 2 and FIG. 3, a tension sprocket 70 is adjustably mounted in the horizontal direction in cooperation with the chain 68 for power transmission, and thereby gives an adequate tension thereto. The pair of endless chain members 54, 56 are respectively equipped with other tension sprocket members 72, 74 which also give tension thereto to the same degree.

At both the starting and terminal points of the conveying feed path 58 for the pallets, as shown in FIG. 2, there is schematically shown endless roller chain members 76, 78 for feeding a pallet 26 at right angles with respect to the conveying direction of the path 58, which are respectively mounted in a manner of free elevation by means of short-stroke pneumatic cylinder members 80, 82. Since the endless roller chain members 76, 78 are normally located at an elevation slightly lower than the level of the conveying feed path 58 for the pallets, the members 76 and 78 never interfere with the travel of the pallets. In a similar manner, at the starting and terminal points of the conveying return path 60 for the pallets, endless roller chain members 84, 86 are mounted in a similar manner as are the members 76 and 78 in the foregoing path 58. Similarly, since the endless roller chain members 84, 86 are normally located at an elevation slightly lower than the level of the conveying return path 60 for the pallets, the members 84 and 86 do not interfere with the travel of the pallets.

As shown in FIG. 2, other endless roller chain members 88, 90 for pallet transfer are correspondingly mounted outside both the starting and terminal points of each conveying path and are supported by linear actuator members 92, 94 which freely elevate and lower members 88 and 90 between the levels of conveying feed path 58 for the pallets and the conveying return path 60 for the pallets, respectively. In an exemplary embodiment illustrated in FIG. 2, a pneumatic cylinder having a long-travel stroke length sufficient for the piston rod is illustrated, however, it will be of course apparent that various other types of elevating mechanisms may be selectably adopted according to the practical conditions applicable for a particular field.

Figure 1:
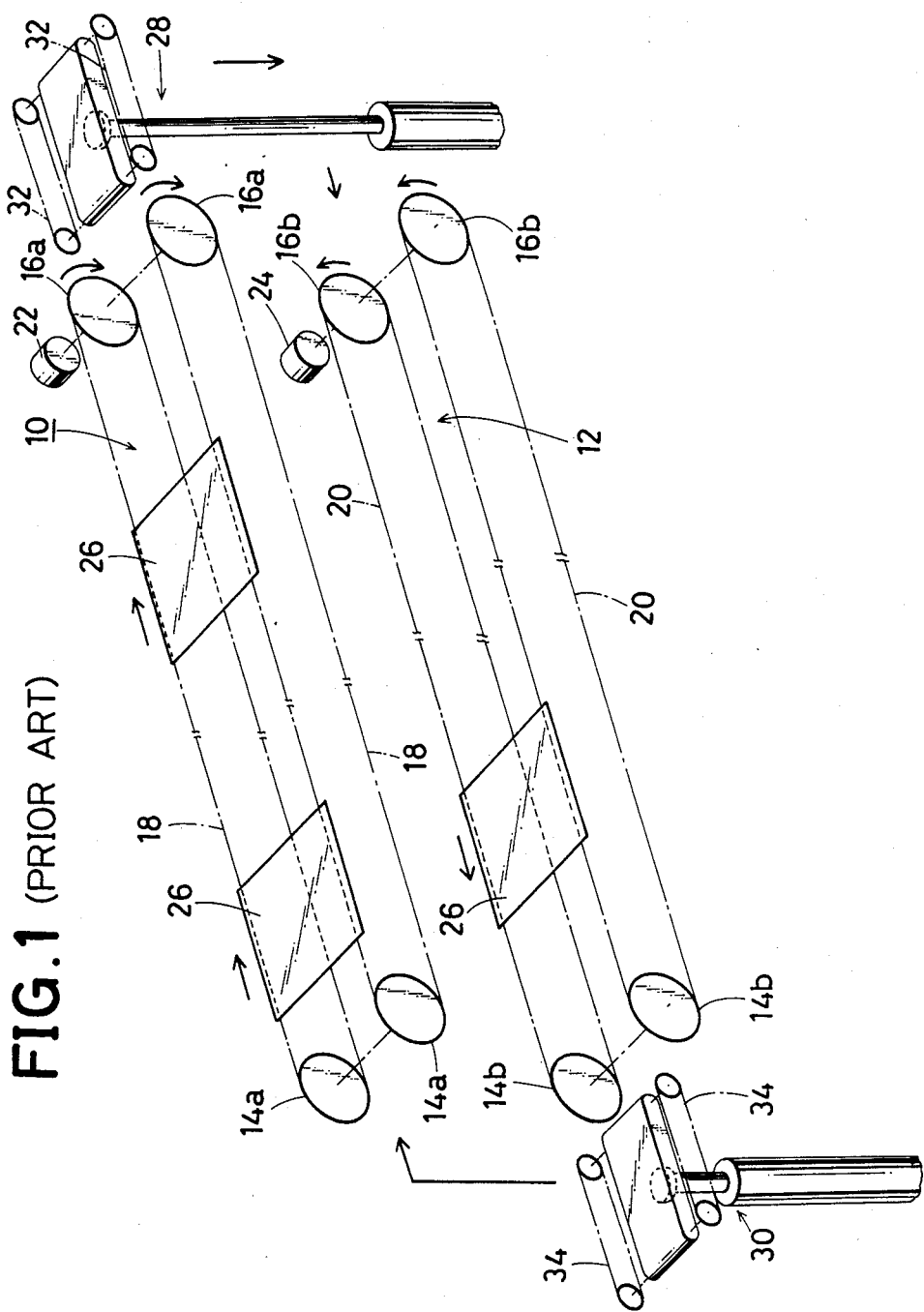
FIG. 1 is a schematic view in perspective of the free flow conveyor of the prior art.

The free flow conveyor of the present invention is basically comprised as described in the foregoing. With the motor 64 driven, the roller chains 54, 56 mounted on both sides of the upper and lower conveying paths travel simultaneously in a required direction whereby such can attain not merely a simplification of the drive mechanism but also a reduction in costs involved in the production of the system as a result of not having independently mounted motors respectively for both the upper and lower conveying paths as is the case with the free flow conveyor of the prior art described with reference to FIG. 1. With the result of necessitating only a single motor sufficient for the driving operation, the present invention can contribute greatly to advantageous effects, such as, for example, a minimization of electric power consumption, curtailment of operating costs, or the like.

Now for reference, the movements of pallets on the free flow conveyor of the present invention will be described with the passage of time as follows. For example, the pallet 26 conveyed in the horizontal direction on the conveying feed path 58 for the pallets is stopped with the aid of a stopper, not shown, at the required position both in the vicinity of the terminal end thereof and above the roller chains 78. Consequently, when the pneumatic cylinder 82 is energized, the roller chains 78 are elevated to a level higher than the level of conveying path 58 so as to support the pallet 26. Then, the roller chains 78 are driven in the clockwise direction, and the pallet 26 is fed out to the side of the upper conveying path 58. At this time, the other roller chains 90 are disposed at the fed-out position, and receive the pallet 26, after which the roller chains 90 are lowered to the level of conveying return path 60 for the pallets by means of the linear actuator 94 which is reversely energized. The roller chains 90 are driven in the counterclockwise direction so as to transfer the pallet 26 onto roller chains 86, the conveyor unit of which has been elevated above the level of return path 60 by means of its pneumatic cylinder 83. The pneumatic cylinder 83 is subsequently lowered so as to place the pallet 26 upon conveyor return path 60 whereby the pallet 26 is able to be transferred to the opposite terminal end of the conveyor system at which time the pallet 26 is then stopped by means of a stopper, not shown. Next, the roller chain 84 is elevated by means of its pneumatic cylinder 81 so as to support the pallet 26 before chain 84 is driven in the clockwise direction so as to feed the pallet 26 out to the side of the conveying path 60, whereby the pallet 26 is transferred to another roller chain 88 which waits for the pallet 26 at the same level. The roller chain 88 is then elevated up to the level of the upper conveying path 58 by means of the linear actuator 92, and chains 88 are then driven in the counterclockwise direction so as to transfer the pallet 26 onto the roller chain 76 which has been elevated by means of its pneumatic cylinder 80. Thereafter, with the pneumatic cylinder 80 reversely energized, the roller chain 76 is lowered, and the pallet 26 supported thereon is freely loaded onto both roller chains 54, 56 of the upper conveying path 58 and is again fed through the path 58 in the required direction. Afterwards, the cycle, as described above, is repeated.

While the invention has been particularly shown and described with reference to preferred embodiments thereof, it will be understood by those skilled in the art that modifications in form and details can be made thereto without departing from the spirit and scope of the invention.

What is claimed is:

1. A free flow conveyor system for conveying articles, comprising:
    a first endless conveyor chain;
    a second endless conveyor chain laterally spaced from said first endless conveyor chain so as to form with said first endless conveyor chain an upper conveyor path and a lower coveyor path for conveying said articles from a first end of said upper conveyor path to a second end of said upper conveyor path, and from a first end of said lower conveyor path, disposed beneath said second end of said upper conveyor path, to a second end of said lower conveyor path disposed beneath said first end of said upper conveyor path, with said articles being disposed in a right-side up orientation while being conveyed along both of said upper and lower conveyor paths; and
    means for transferring said articles in a transverse direction, relative to the direction of travel of said articles along said upper and lower conveyor paths between said first and second ends of said upper and lower conveyor paths, by removing said articles from said first and second endless conveyor chains at said second end of said upper conveyor path and re-depositing said articles upon said first and second endless conveyor chains at said first end of said lower conveyor path, and by removing said articles from said first and second endless conveyor chains at said second end of said lower conveyor path and re-depositing said articles upon said first and second endless conveyor chains at said first end of said upper conveyor path.

2. A conveyor system as set forth in claim 1, further comprising:

single drive means for driving both of said first and second endless conveyor chains.

3. A conveyor system as set forth in claim 1, wherein said transferring means comprises:
conveyor means vertically movable between said upper and lower conveyor paths.

4. A conveyor system as set forth in claim 3, wherein said vertically movable conveyor means comprises:
a first conveyor disposed within the vicinity of said second end of said upper conveyor path and said first end of said lower conveyor path and vertically movable between said second end of said upper conveyor path and said first end of said lower conveyor path for moving said articles from said second end of said upper conveyor path to said first end of said lower conveyor path; and
a second conveyor disposed within the vicinity of said second end of said lower conveyor path and said first end of said upper conveyor path and vertically movable between said second end of said lower conveyor path and said first end of said upper conveyor path for moving said articles from said second end of said lower conveyor path to said first end of said upper conveyor path.

5. A conveyor system as set forth in claim 4, wherein:
said first and second conveyors are disposed laterally outside of said upper and lower conveyor paths.

6. A conveyor system as set forth in claim 5, further comprising:
a third conveyor disposed within said upper conveyor path between said first and second endless conveyor chains for transferring said articles from said upper conveyor path to said first conveyor;
a fourth conveyor disposed within said lower conveyor path between said first and second endless conveyor chains for receiving said articles from said first conveyor;
a fifth conveyor disposed within said lower conveyor path said first and second endless conveyor chains for transferring said articles from said lower conveyor path to said second conveyor; and
a sixth conveyor disposed within said upper conveyor path between said first and second endless conveyor chains for receiving said articles from said second conveyor.

7. A conveyor system as set forth in claim 6, wherein:
each of said third, fourth, fifth, and sixth conveyors are vertically adjustable relative to the planes of said upper and lower conveyor paths so as to facilitate said transfer operations between said third, fourth, fifth, and sixth conveyors, relative to said first and second conveyors, and yet enable said conveying of said articles along said upper and lower conveyor paths without interference with said third, fourth, fifth, and sixth conveyors.

8. A conveyor system as set forth in claim 6, wherein:
all of said first, second, third, fourth, fifth, and sixth conveyors are roller chain conveyors.

9. A free flow conveyor system for conveying articles, comprising:
an endless conveyor defining an upper conveyor path and a lower conveyor path for conveying said articles from a first end of said upper conveyor path to a second end of said upper conveyor path, and from a first end of said lower conveyor path, disposed beneath said second end of said upper conveyor path, to a second end of said lower conveyor path disposed beneath said first end of said upper conveyor path, with said articles being disposed in a right-side up orientation while being conveyed along both of said upper and lower conveyor paths; and
means for transferring said articles in a transverse direction, relative to the direction of travel of said articles along said upper and lower conveyor paths between said first and second ends of said upper and lower conveyor paths, by removing said articles from said endless conveyor at said second end of said upper conveyor path and re-depositing said articles upon said endless conveyor at said first end of said lower conveyor path, and by removing said articles from said endless conveyor at said second end of said lower conveyor path and re-depositing said articles upon said endless conveyor at said first end of said upper conveyor path.

10. A conveyor system as set forth in claim 9, wherein:
said endless conveyor is comprised of a pair of laterally spaced endless conveyor chains.

11. A conveyor system as set forth in claim 9, wherein said transferring means comprises:
conveyor means for moving said articles in a direction transversely with respect to the direction of movement of said articles along said upper and lower conveyor paths between said first and second ends of said upper and lower conveyor paths.

12. A free flow conveyor system for conveying articles, comprising:
an endless conveyor defining an upper conveyor path and a lower conveyor path for conveying articles from a first end of said upper conveyor path to a second end of said upper conveyor path, and from a first end of said lower conveyor path, disposed beneath said second end of said upper conveyor path, to a second end of said lower conveyor path disposed beneath said first end of said upper conveyor path, with said articles being disposed in a right-side up orientation while being conveyed along both of said upper and lower conveyor paths; and
means for transferring said articles in a lateral direction, relative to the direction of travel of said articles along said upper and lower conveyor paths between said first and second ends of said upper and lower conveyor paths, by removing said articles from said endless conveyor at said second end of said upper conveyor path and re-depositing sid articles onto said end less conveyor at said first end of said lower conveyor path, and by removing aid articles from said second end of said endless conveyor at said second end of said lower conveyor path and re-depositing said articles onto said endless conveyor at said first end of said upper conveyor path.

13. A conveyor system as set forth in claim 12, wherein:
said endless conveyor is comprised of a pair of laterally spaced endless conveyor chains.

14. A conveyor system as set forth in claim 13, further comprising:
single drive means for driving both of said laterally spaced conveyor chains.

15. A conveyor system as set forth in claim 13, wherein said transferring means comprises:
conveyor means vertically movable between said upper and lower conveyor paths.

16. A conveyor system as set forth in claim 15, wherein said vertically movable conveyor means comprises:
- a first conveyor disposed laterally to one side of said upper and lower conveyor paths within the vicinity of said second end of said upper conveyor path and said first end of said lower conveyor path and vertically movable between said second end of said upper conveyor path and said first end of said lower conveyor path for moving said articles from said second end of said upper conveyor path to said first end of said lower conveyor path; and
- a second conveyor disposed laterally to one side of said upper and lower conveyor paths within the vicinity of said second end of said lower conveyor path and said first end of said upper conveyor path and vertically movable between said second end of said lower conveyor path and said first end of said upper conveyor path for moving said articles from said second end of said lower conveyor path to said first end of said upper conveyor path.

17. A conveyor system as set forth in claim 16, wherein said transferring means further comprises:
- a third conveyor disposed within said upper conveyor path between said first and second endless conveyor chains for transferring said articles from said upper conveyor path to said first conveyor;
- a fourth conveyor disposed within said lower conveyor path between said first and second endless conveyor chains for receiving said articles from said first conveyor;
- a fifth conveyor disposed within said lower conveyor path between said first and second endless conveyor chains for transferring said articles from said lower conveyor path to said second conveyor; and
- a sixth conveyor disposed within said upper conveyor path between said first and second endless conveyor chains for receiving said articles from said second conveyor.

18. A conveyor system as set forth in claim 17, wherein:
- each of said third, fourth, fifth, and sixth conveyors are vertically adjustable relative to the planes of said upper and lower conveyor paths so as to facilitate said transfer operations between said third, fourth, fifth, and sixth conveyors, relative to said first and second conveyors, and yet enable said conveying of said articles along said upper and lower conveyor paths without interference with said third, fourth, fifth, and sixth conveyors.

19. A conveyor system as set forth in claim 17, wherein:
- all of said first, second, third, fourth, fifth, and sixth conveyors are roller chain conveyors.

20. A conveyor system as set forth in claim 9, further comprising:
- hydraulic elevational means for adjusting the elevation of said transfer means between said upper and lower conveyor paths.

* * * * *